United States Patent [19]

Pattas

[11] Patent Number: 5,067,973
[45] Date of Patent: Nov. 26, 1991

[54] METHOD OF AND AN APPARATUS FOR REGENERATING A DIESEL PARTICULATE EXHAUST FILTER

[76] Inventor: Konstatin N. Pattas, Abelonon 73, 55535 Thessaloniki, Greece

[21] Appl. No.: 497,651

[22] Filed: Mar. 23, 1990

[51] Int. Cl.$^5$ ............................................. B01D 46/04
[52] U.S. Cl. ................................... 55/96; 55/283; 55/466; 55/523; 55/DIG. 30; 55/312; 60/311; 60/286
[58] Field of Search .............. 55/96, 283, 267, 312, 55/466, 523, DIG. 30; 60/311, 274, 286, 288, 277

[56] References Cited

U.S. PATENT DOCUMENTS

| | | | |
|---|---|---|---|
| 3,832,848 | 9/1974 | Scholl | 60/274 |
| 4,574,589 | 3/1986 | Hasegawa et al. | 60/311 |
| 4,835,963 | 6/1989 | Hardy | 60/286 |

FOREIGN PATENT DOCUMENTS

| | | | |
|---|---|---|---|
| 0231828 | 8/1987 | European Pat. Off. | |
| 252819 | 10/1986 | Japan | 60/277 |

Primary Examiner—Bernard Nozick
Attorney, Agent, or Firm—Laubscher, Presta & Laubscher

[57] ABSTRACT

A method of and an apparatus for regenerating a diesel filter (1) mounted in the exhaust pipe (3) of a diesel engine (2) wherein for initiating regeneration, the exhaust flow is throttled in the exhaust pipe (3) and/or in an exhaust feedback passage (7) by means of a control unit (10) responsive to setpoint exhaust temperatures measured upstream and downstream of the diesel filter (1) in the exhaust pipe (3), and that the air ratio is set to a value between 1.2 and 1.3 to inhibit regeneration.

9 Claims, 2 Drawing Sheets

METHOD OF AND AN APPARATUS FOR REGENERATING A DIESEL PARTICULATE EXHAUST FILTER

SPECIFICATION STATEMENT OF THE INVENTION

The invention is directed to a method of and an apparatus for regenerating a diesel particulate exhaust soot filter (briefly: diesel filter) mounted in the exhaust pipe of a diesel engine.

BRIEF DESCRIPTION OF THE PRIOR ART

In a known method of the specified kind (EP 87 100 911.4) the exhaust gas is throttled upstream of the diesel filter, as viewed in the direction of flow, so that the regenerating temperature is either reached or exceeded. Then, the particulate deposited in the diesel filter is burnt off.

SUMMARY OF THE INVENTION

It is the object of the present invention to provide a method and an apparatus of the specified kind, in which fully automatic regeneration during operation of the diesel engine, on the one hand, and protection against uncontrolled regeneration, i.e. against unintentional burning-off of the particulate deposited in the diesel filter, on the other hand, can be achieved.

In accordance with the present invention the specified object is solved in that the actual temperatures of the exhaust gas upstream and downstream of the diesel filter are detected, that the regenerating operation is automatically initiated when a first setpoint exhaust temperature is reached upstream of the diesel filter in operation of the diesel engine, that the regenerating operation is automatically turned off when a second setpoint exhaust temperature upstream of the diesel filter is exceeded and that, when a predetermined exhaust temperature downstream of the diesel filter is exceeded, regeneration of the diesel filter is inhibited by either setting the air ratio (lambda) to a setpoint within a range of more than 1, especially of 1.2 to 1.3, or temporarily cutting the diesel filter out of the exhaust stream by passing the exhaust through a bypass passage which bypasses the diesel filter.

Alternatively, an apparatus according to the present invention is characterized by a lambda probe for sensing the oxygen content in the exhaust gas, temperature sensors for sensing the actual exhaust temperatures in the exhaust pipe upstream and downstream of the diesel filter, and a control unit to which the measured actual exhaust temperatures and the setpoint exhaust temperatures are applied as inputs and which provides as outputs control signals for the throttle device, or by a bypass passage branching off from the exhaust pipe upstream of the diesel filter, as viewed in the direction of exhaust flow, and bypassing the diesel filter, with a check valve disposed in said bypass passage, temperature sensors for measuring the actual exhaust temperature in the exhaust pipe upstream and downstream of the diesel filter, and a control unit to which the measured actual exhaust temperatures and the setpoint exhaust temperatures are applied as inputs and which provides as outputs control signals for the throttle device and the check valve to open said check valve and to close the throttle device for inhibiting regeneration.

The present invention is based on the following findings:

Experiments have shown that combustion of the air-fuel mixture in the diesel engine at an air ratio of lambda $=1.2$ to 1.3 leads to a residual oxygen content of 5% to 7% in the exhaust gas. The inventor has found that, when the air ratio is maintained at a lambda value as specified, uncontrolled burning-off of the particulate deposited on the diesel filter can no longer happen. It becomes possible to throttle the exhaust flow in a controlled way in the exhaust pipe main stream and/or in an exhaust feedback flow so that controlled regeneration, i.e. burning-off of particulate, in the diesel filter is achieved.

Alternatively, when critical temperature values are reached the exhaust flow automatically bypasses the diesel filter so that the latter is protected against uncontrolled burning-off.

The setpoint exhaust temperatures are advantageously varied in response to the pressure drop in the exhaust pressure across the diesel filter in accordance with prescribed functions.

BRIEF DESCRIPTION OF THE DRAWINGS

Below, an embodiment of the invention will be described in detail with reference to schematic drawings, in which.

DETAILED DESCRIPTION

Figure 1:
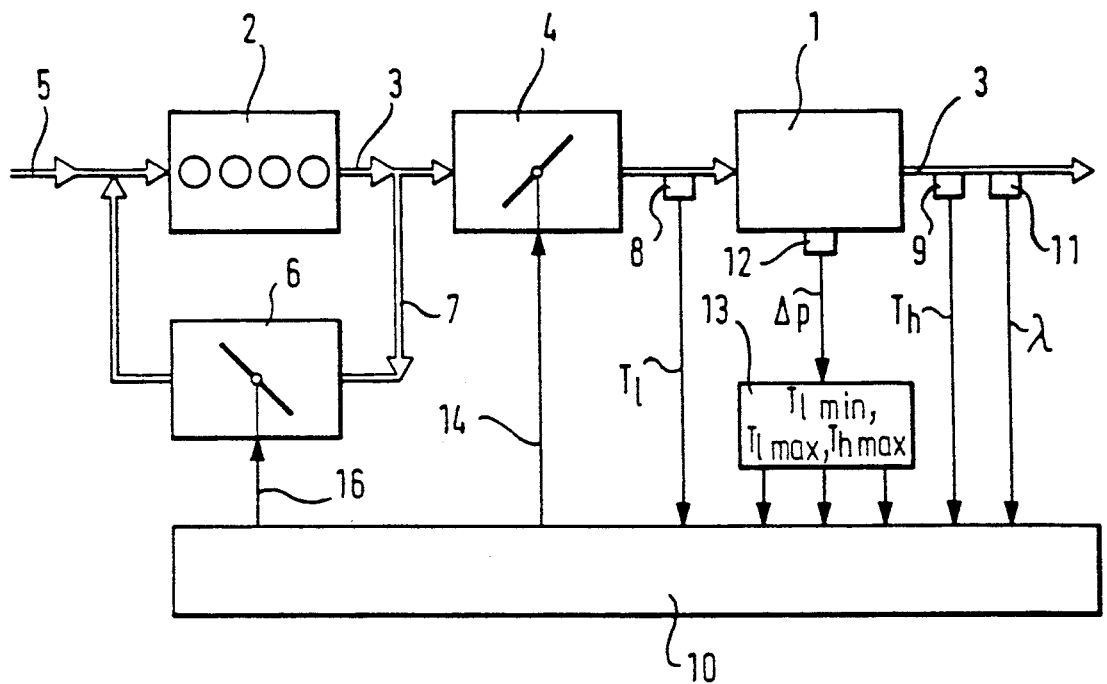
FIG. 1 is a schematic view of an apparatus for regenerating a diesel particulate exhaust filter in accordance with the invention.

FIG. 1 illustrates schematically the fully automatic regeneration of a particulate exhaust filter 1 for a diesel engine 2, the diesel filter 1 being mounted in an exhaust pipe 3. A variable throttle device 4 is mounted in the exhaust pipe 3 intermediate the diesel filter 1 and the diesel engine 2. The necessary air for combustion is supplied to the diesel engine 2 through an intake pipe 5. A second variable throttle device 6 is mounted in an exhaust feedback passage 7 branching off the exhaust pipe 3 between the diesel engine 2 and the first throttle device 4 and terminating in the intake pipe 6.

Figure 2:
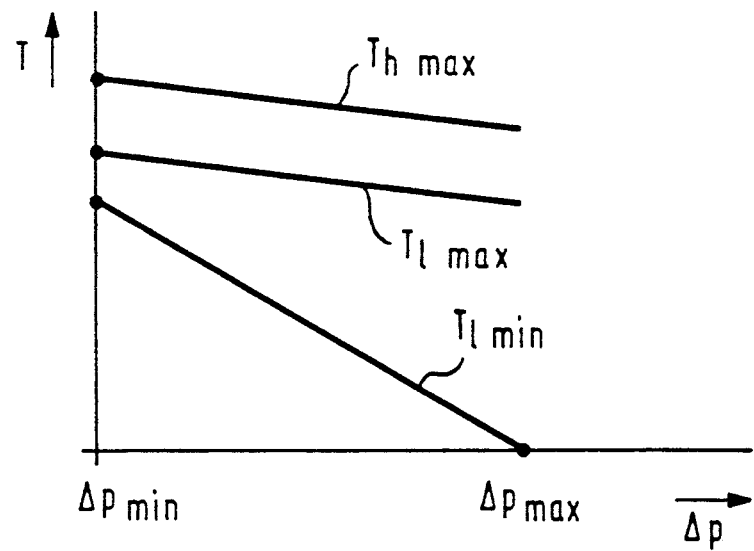
FIG. 2 is a diagram in which the setpoint exhaust temperatures are plotted versus the drop in the exhaust flow pressure across the diesel filter.

Temperature sensors 8, 9 are mounted in the exhaust pipe 3 upstream and downstream of the diesel filter 1 for measuring the temperatures $T_l$ and $T_h$ in the exhaust pipe 3 and providing said temperatures as inputs to a control unit 10. Also, a lambda probe 11 is mounted in the exhaust pipe downstream of the diesel filter 1 for measuring the oxygen content of the exhaust, the output signal of said probe being also provided as an input to the control unit 10. The measured oxygen content is a criterion for the air ratio. Finally, a differential pressure sensor indicated at 12 is used to measure the pressure drop $\Delta p$ across the diesel soot filter. The output signal from the differential pressure sensor 12 is provided as input to a functional module 13 in which setpoint exhaust temperatures are determined, viz. a minimum exhaust temperature $T_{lmin}$ for automatically initiating a regeneration of the diesel filter 1 when said temperature is reached in operation of the diesel engine 2, a setpoint exhaust temperature $T_{lmax}$ upstream of the diesel filter for automatically turning the regeneration off when said temperature is exceeded, and a setpoint exhaust temperature $T_{hmax}$ downstream of the diesel filter 1 for automatically inhibiting regeneration of the diesel filter when said temperature is exceeded. The specified setpoint temperatures are varied in the functional module 13 in accordance with prescribed functions for the specified temperatures in response to the variation of the pressure drop $\Delta_p$ across the diesel filter 1. FIG. 2 illustrates examples of such functions with a linear characteristic.

The control operation performed in the control unit 10 results in control signals which are supplied via control signal lines 14, 16 either selectively or jointly to both throttle devices 4, 6 to thereby cause controlled regeneration or the desired protection from uncontrolled regeneration of the diesel filter 1, respectively.

The control operation is simplified due to the fact that the pressure drop $\Delta p$ need not be measured inside a specific rotational speed window in operation of the diesel engine 2. In other words, the value $\Delta p$ measured by means of the differential pressure sensor 12 is an instantaneous value measured at the respective operating condition of the diesel engine.

The examples of functions illustrated in FIG. 2 are linear. The function $T_{lmin}=f_3(\Delta p)$ has a larger relative inclination than the two other functions so as to adapt the regenerating operation to the frequent vehicle operation in "crawling" traffic.

The criterion for decreasing $T_{lmax}$ and $T_{hmax}$ resides in keeping the maximum wall temperature of the ceramic diesel filter approximately constant during regeneration, because this maximum wall temperature increases with increasing load on the diesel filter.

A coarser although considerably simpler control can be achieved by assuming that the setpoint exhaust temperatures $T_{hmax}$ and $T_{lmax}$ are constant, i.e., they are not varied with the pressure drop $\Delta p$. and by varying $T_{lmin}$ stepwise with the pressure drop.

Figure 3:
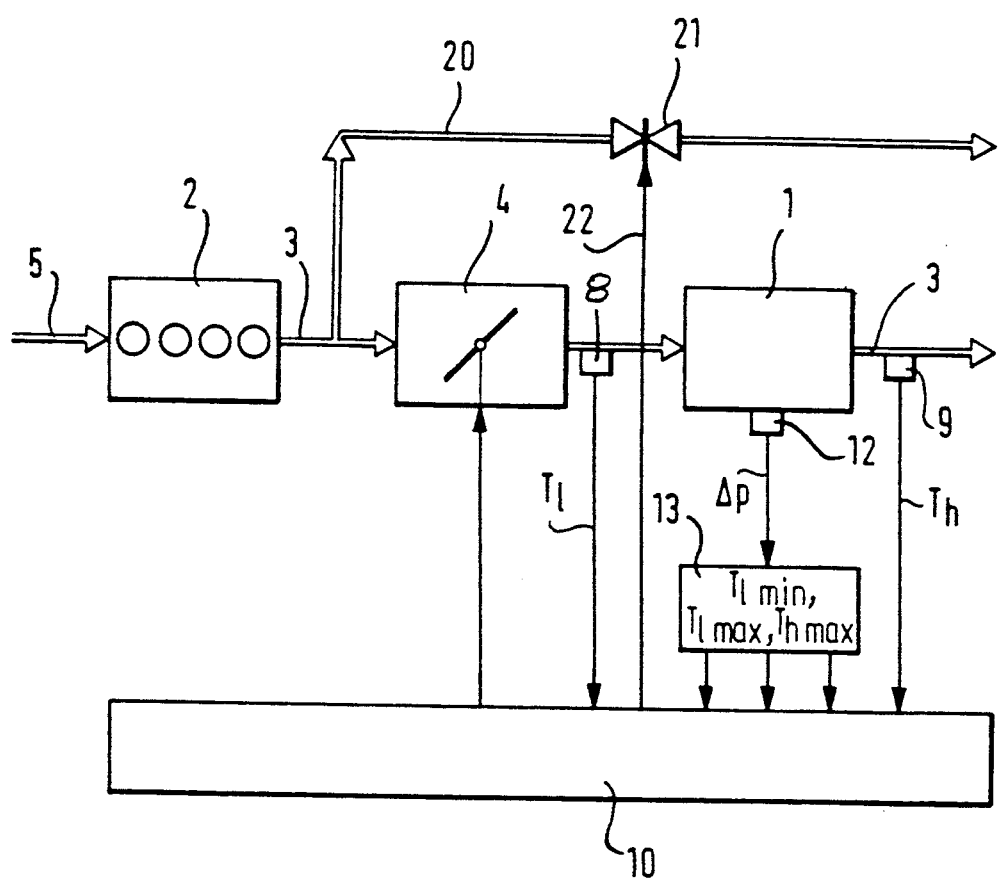
FIG. 3 is a modification of an apparatus according to the invention.

In FIG. 3 the same or similar parts are indicated by the same reference numerals and will not be described again. A lambda probe and exhaust feedback are not provided herein. Instead, a bypass passage 20 having a check valve 21 mounted therein branches off the exhaust pipe 3 downstream of the diesel engine. This check valve, which alternatively realizes only an open-closed position, is actuated to the open state by the control unit via the signal flow line 22 while the throttle device 4 is simultaneously closed whenever $T_{hmax}$ downstream of the diesel filter 1 is exceeded, so that the diesel filter is automatically cut out of the exhaust gas flow and is thereby protected against uncontrolled burning-off. Inversely, in the normal case and for regenerating the diesel filter the check valve 21 is automatically kept closed while the throttle device 4 is kept open. For the rest, the control operation is the same as that explained with reference to FIGS. 1 and 2.

I claim:

1. A method of regenerating a diesel particulate exhaust soot filter mounted in the exhaust pipe of a diesel engine, the exhaust being throttled upstream of the diesel filter, as viewed in flow direction, so that at least the regenerating temperature is reached, comprising the steps of:
   (a) measuring the actual temperature ($T_l$ and $T_h$) upstream and downstream of the diesel filter;
   (b) automatically initiating regeneration when a first setpoint exhaust temperature ($T_{lmin}$) is reached upstream of the diesel filter;
   (c) automatically turning off the regeneration when a second setpoint exhaust temperature ($T_{lmax}$) upstream of the diesel filter is exceeded;
   (d) preventing regeneration of the diesel filter by controlling the throttling when a predetermined third exhaust temperature ($T_{hmax}$) downsteram of the diesel filter is exceeded; and
   (e) varying said first, second and third setpoint exhaust temperatures ($T_{lmin}$, $T_{lmax}$, $T_{hmax}$) in response to the pressure drop ($\Delta p$) across the diesel filter.

2. The method as defined in claim 1, and further wherein regeneration of the diesel filter is inhibited by temporarily cutting the diesel filter out of the exhaust stream by passing the exhaust through a bypass passage (20) which bypasses the diesel filter.

3. The method as defined in claim 1, wherein the regeneration of the diesel filter is inhibited by setting the air ratio (lambda) to a setpoint within a range greater than 1.

4. The method as claimed in claim 3, characterized in that the air ratio is adjusted by controlled throttling of the exhaust in the exhaust pipe main stream upstream of the diesel filter and is verified by measuring the oxygen content in the exhaust.

5. The method as defined in claim 4 wherein the air ratio is adjusted to the setpoint by controlled throttling of an exhaust feedback flow and is verified by measuring the oxygen content in the exhaust.

6. An apparatus for regenerating a diesel particulate exhaust soot filter mounted in the exhaust pipe of a diesel engine, in which a variable throttle device (4) is disposed in the exhaust pipe upstream of the diesel filter (1), as viewed in flow direction, characterized by a bypass passage (20) branching off from the exhaust pipe (3) upstream of the throttle device (4), as viewed in flow direction, and bypassing the diesel filter (1), with a check valve (21) disposed in said bypass passage, by temperature sensors (8, 9) for measuring the actual exhaust temperature ($T_l$, $T_h$) in the exhaust pipe (3) upstream and downstream of the diesel filter (1), and by a control unit (10) to which the measured actual exhaust temperature ($T_l$, $T_h$) and setpoint exhaust temperatures ($T_{lmin}$, $T_{lmax}$, $T_{hmax}$) are applied as inputs and which provides as outputs control signals for the throttle device (4) and the check valve (21) to open said check valve and to block the throttle device (4) to thereby inhibit regeneration of the diesel filter (1).

7. Apparatus as defined in claim 6, and further including differential pressure sensor means (12) for measuring the pressure drop ($\Delta p$) in the exhaust across the diesel filter (1), and setpoint adjusting means (13) for adjusting said setpoint exhaust temperatures ($T_{lmin}$, $T_{lmax}$, $T_{hmax}$) as a function of said exhaust pressure drop ($\Delta p$).

8. Apparatus for regenerating a diesel particulate exhaust soot filter mounted on the exhaust pipe of a diesel engine, comprising:
   (a) a diesel particulate exhaust soot filter;
   (b) means (4) for throttling the exhaust upstream of the diesel filter, as viewed in the flow direction, so that at least the regenerating temperature is reached;
   (c) means (8,9) for measuring the actual exhaust temperatures ($T_l$ and $T_h$) upstream and downstream of the diesel filter;
   (d) function module means (13) for automatically initiating regeneration when a first setpoint exhaust temperature ($T_{lmin}$) is reached upstream of the diesel filter, and for automatically turning off the regeneration when a second setpoint exhaust temperature ($T_{lmax}$) upstream of the diesel filter is exceeded;

(e) means (11,20) for controlling the throttling to prevent regeneration of the diesel filter when a predetermined third exhaust temperature ($T_{max}$) downstream of the diesel filter is exceeded; and (f) differential pressure responsive means (12) for varying said first, second and third setpoint exhaust temperatures ($T_{lmin}$, $T_{max}$, $T_{hmax}$) in response to the pressure drop ($\Delta p$) across the diesel filter.

9. Apparatus as defined in claim 8, and further including exhaust feedback means (7) having a variable throttle device (6) connected across said diesel engine, and control means responsive to the oxygen content of the exhaust gas adjacent the exhaust pipe for operating said variable throttle device.

* * * * *